US006719629B2

(12) United States Patent
Yang

(10) Patent No.: US 6,719,629 B2
(45) Date of Patent: Apr. 13, 2004

(54) COMPUTER-IMPLEMENTED METHOD AND GAMING APPARATUS FOR PLAYING CARD GAMES IN SUCCESSION

(75) Inventor: Arden Yang, Rosemead, CA (US)

(73) Assignee: Tai Game Tech Corp., Taipei Hsien (TW)

( * ) Notice: Subject to any disclaimer, the term of this patent is extended or adjusted under 35 U.S.C. 154(b) by 148 days.

(21) Appl. No.: 10/151,498

(22) Filed: May 20, 2002

(65) Prior Publication Data

US 2003/0176208 A1 Sep. 18, 2003

(30) Foreign Application Priority Data

Mar. 14, 2002 (TW) ....................................... 91104848 A

(51) Int. Cl.[7] ............................ A63F 13/00; A63F 1/00

(52) U.S. Cl. ............................ 463/13; 463/16; 463/23; 273/292

(58) Field of Search .............................. 463/11, 12, 16, 463/22, 29, 1, 23; 273/292, 274

(56) References Cited

U.S. PATENT DOCUMENTS

| | | | | |
|---|---|---|---|---|
| 6,336,857 B1 * | 1/2002 | McBride | 463/12 |
| 6,357,749 B1 * | 3/2002 | Feola | 273/292 |
| 6,503,145 B1 * | 1/2003 | Webb | 463/16 |
| 6,575,467 B1 * | 6/2003 | Kal | 273/292 |
| 2003/0137109 A1 * | 7/2003 | Vancura | 273/292 |

* cited by examiner

*Primary Examiner*—Jessica Harrison
(74) *Attorney, Agent, or Firm*—Ladas & Parry

(57) ABSTRACT

A computer-implemented method is adapted for playing at least first and second card games in succession. Each of the card games is associated with a respective set of card rules. In the method, a gaming apparatus includes a user input unit and a display unit, and the player is allowed to place a bet via the user input unit. The card games are played in succession such that the cards in a previous card game are combined with new cards and are reshuffled for selection to result in the cards of a succeeding card game. A computer program product for a gaming apparatus that includes a user input unit, a display unit and a processor unit is also disclosed.

24 Claims, 4 Drawing Sheets

COMPUTER-IMPLEMENTED METHOD AND GAMING APPARATUS FOR PLAYING CARD GAMES IN SUCCESSION

CROSS-REFERENCE TO RELATED APPLICATION

This application claims priority of Taiwan Patent Application No. 091104848, filed on Mar. 14, 2002.

BACKGROUND OF THE INVENTION

1. Field of the Invention

The invention relates to a gaming apparatus, more particularly to a computer-implemented method and gaming apparatus for playing card games in succession.

2. Description of the Related Art

Conventional gaming apparatus allow players to play only one kind of card game. After playing with the conventional gaming apparatus for a period of time, players easily get bored. As such, there is always a need to develop new gaming apparatus that can maintain player interest for longer periods of time.

SUMMARY OF THE INVENTION

Therefore, the object of the present invention is to provide a computer-implemented method and gaming apparatus for playing card games in succession so as to overcome the aforesaid drawbacks of the conventional gaming apparatus.

According to one aspect of the invention, there is provided a computer-implemented method for playing at least first and second card games in succession. The computer-implemented method comprises:

a) providing a gaming apparatus that includes a user input unit and a display unit;

b) playing the first card game, including the steps of
 (b-1) enabling the gaming apparatus to deal a first number of simulated cards to the player,
 (b-2) allowing the player to place a first bet for the first card game via the user input unit, and
 (b-3) determining result of the first card game, and adjusting a credit total for the player according to the result of the first card game and with reference to the first bet placed by the player; and c) playing the second card game, including the steps of
 (c-1) enabling the gaming apparatus to deal a second number of the simulated cards to the player, to combine the second number of the simulated cards with the first number of the simulated cards, and to reshuffle the first and second numbers of the simulated cards,
 (c-2) allowing the player to select a third number of the simulated cards from the reshuffled first and second numbers of the simulated cards for playing the second card game,
 (c-3) allowing the player to place a second bet for the second card game via the user input unit, and
 (c-4) determining result of the second card game, and adjusting the credit total for the player according to the result of the second card game and with reference to the second bet placed by the player.

According to another aspect of the invention, there is provided a computer program product for a gaming apparatus that includes a user input unit, a display unit and a processor unit coupled to the user input unit and the display unit. The computer program product adapts the gaming apparatus for playing at least first and second card games in succession. The computer program product comprises:

a computer readable storage medium comprising:
 a first code that directs the processor unit to allow the player to play the first card game, including a code that directs the processor unit to deal a first number of simulated cards to the player, a code that directs the processor unit to allow the player to place a first bet for the first card game via the user input unit, and a code that directs the processor unit to determine result of the first card game, and to adjust a credit total for the player according to the result of the first card game and with reference to the first bet placed by the player; and
 a second code that directs the processor unit to allow the player to play the second card game, including: a code that directs the processor unit to deal a second number of the simulated cards to the player, to combine the second number of the simulated cards with the first number of the simulated cards, and to reshuffle the first and second numbers of the simulated cards; a code that directs the processor unit to allow the player to select a third number of the simulated cards from the reshuffled first and second numbers of the simulated cards for playing the second card game; a code that directs the processor unit to allow the player to place a second bet for the second card game via the user input unit; and a code that directs the processor unit to determine result of the second card game, and to adjust a credit total for the player according to the result of the second card game and with reference to the second bet placed by the player.

According to yet another aspect of the invention, a gaming apparatus is adapted for playing at least first and second card games in succession. The gaming apparatus comprises:

a user input unit;

a display unit;

means for allowing the player to play the first card game, including means for enabling the gaming apparatus to deal a first number of simulated cards to the player, means for allowing the player to place a first bet for the first card game via the user input unit, and means for determining result of the first card game, and for adjusting a credit total for the player according to the result of the first card game and with reference to the first bet placed by the player; and means for allowing the player to play the second card game, including: means for enabling the gaming apparatus to deal a second number of the simulated cards to the player, to combine the second number of the simulated cards with the first number of the simulated cards, and to reshuffle the first and second numbers of the simulated cards; means for allowing the player to select a third number of the simulated cards from the reshuffled first and second numbers of the simulated cards for playing the second card game; means for allowing the player to place a second bet for the second card game via the user input unit; and means for determining result of the second card game, and for adjusting the credit total for the player according to the result of the second card game and with reference to the second bet placed by the player.

According to a further aspect of the invention, a gaming apparatus comprises a user input unit, a display unit, a processor unit coupled to the user input unit and the display unit, and a computer program product for adapting the gaming apparatus for playing at least first and second card games in succession. The computer program product comprises a computer readable storage medium that includes:

a first code that directs the processor unit to allow the player to play the first card game, including a code that directs the processor unit to deal a first number of simulated cards to the player, a code that directs the processor unit to allow the player to place a first bet for the first card game via the user input unit, and a code that directs the processor unit to determine result of the first card game, and to adjust a credit total for the player according to the result of the first card game and with reference to the first bet placed by the player; and a second code that directs the processor unit to allow the player to play the second card game, including: a code that directs the processor unit to deal a second number of the simulated cards to the player, to combine the second number of the simulated cards with the first number of the simulated cards, and to reshuffle the first and second numbers of the simulated cards; a code that directs the processor unit to allow the player to select a third number of the simulated cards from the reshuffled first and second numbers of the simulated cards for playing the second card game; a code that directs the processor unit to allow the player to place a second bet for the second card game via the user input unit; and a code that directs the processor unit to determine result of the second card game, and to adjust the credit total for the player according to the result of the second card game and with reference to the second bet placed by the player.

Because different card games can be played in succession in a single game round, player interest can be maintained for longer periods of time.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
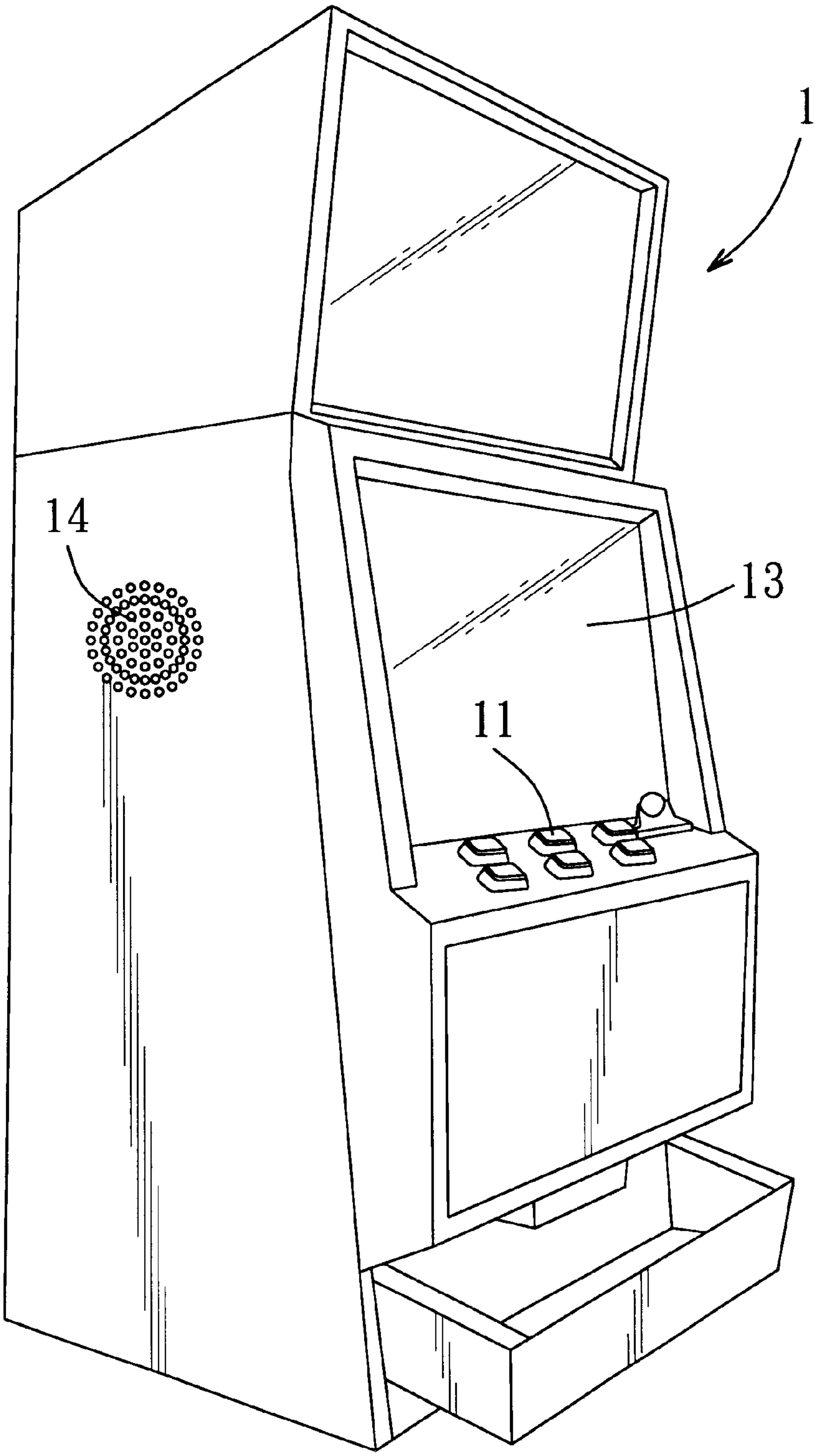
FIG. 1 is a perspective view of the preferred embodiment of a gaming apparatus according to the present invention.
Figure 2:
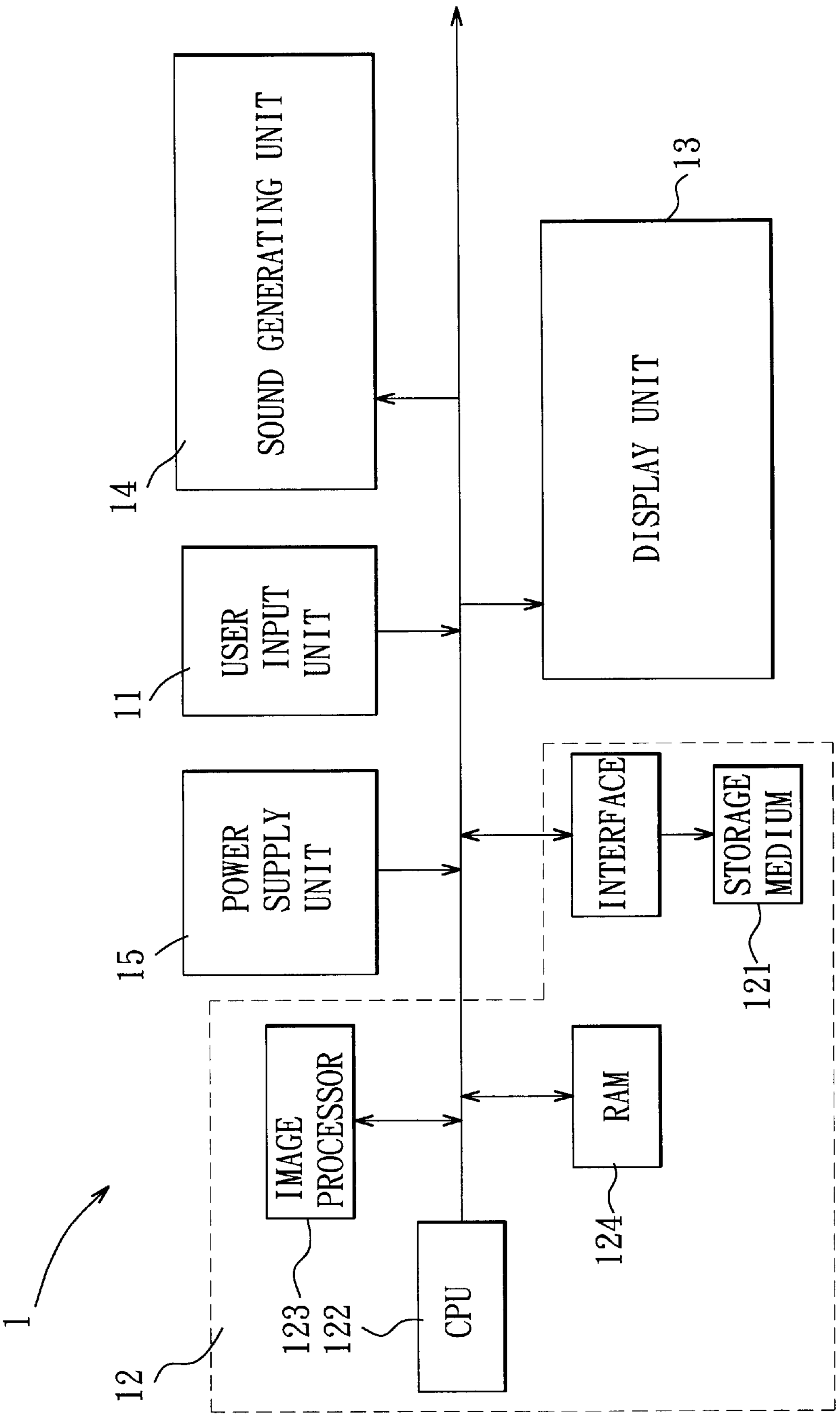
FIG. 2 is a schematic circuit block diagram of the preferred embodiment.

Referring to FIG. 1, the preferred embodiment of a gaming apparatus 1 according to the present invention is adapted for playing card games in succession. Referring further to FIG. 2, the gaming apparatus 1 comprises a user input unit 11, a processor unit 12, a display unit 13, a sound generating unit 14, and a power supply unit 15 coupled to the user input unit 11, the processor unit 12, the display unit 13 and the sound generating unit 14. The user input unit 11 is operable so as to receive an input from the user. The display unit 13 is operable so as to show game images thereon. The sound generating unit 14 is operable so as to provide audible instructions and information to the user. The processor unit 12 is coupled to and controls the operations of the user input unit 11, the display unit 13 and the sound generating unit 14 in accordance with pre-programmed instructions. Preferably, the processor unit 12 is in the form of a circuit board that is mounted removably in the gaming apparatus 1 and that includes: a computer readable storage medium 121, such as a read-only memory device, recorded with program codes for performing the computer-implemented method of this invention; a central processing unit (CPU) 122 for executing the program codes; an image processor 123; and a random access memory (RAM) 124. However, it should be apparent to those skilled in the art that the processor unit 12 can also be implemented with a storage medium in the form of a floppy disk, a compact disk, a game cartridge, or any other readable storage medium.

Figure 3:
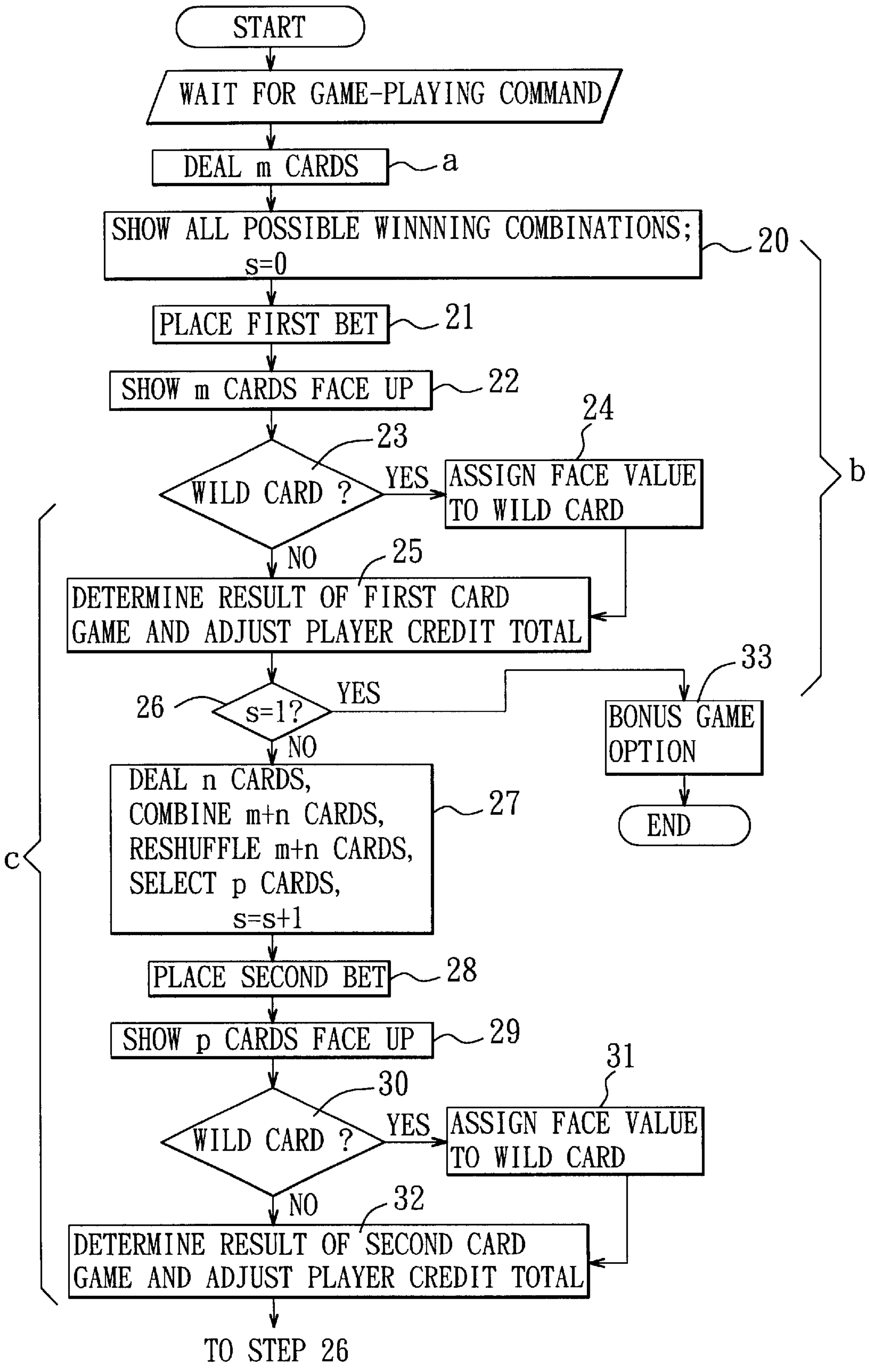
FIG. 3 is a flowchart to illustrate the preferred embodiment of a computer-implemented method for playing card games in succession according to the present invention.
Figure 4:
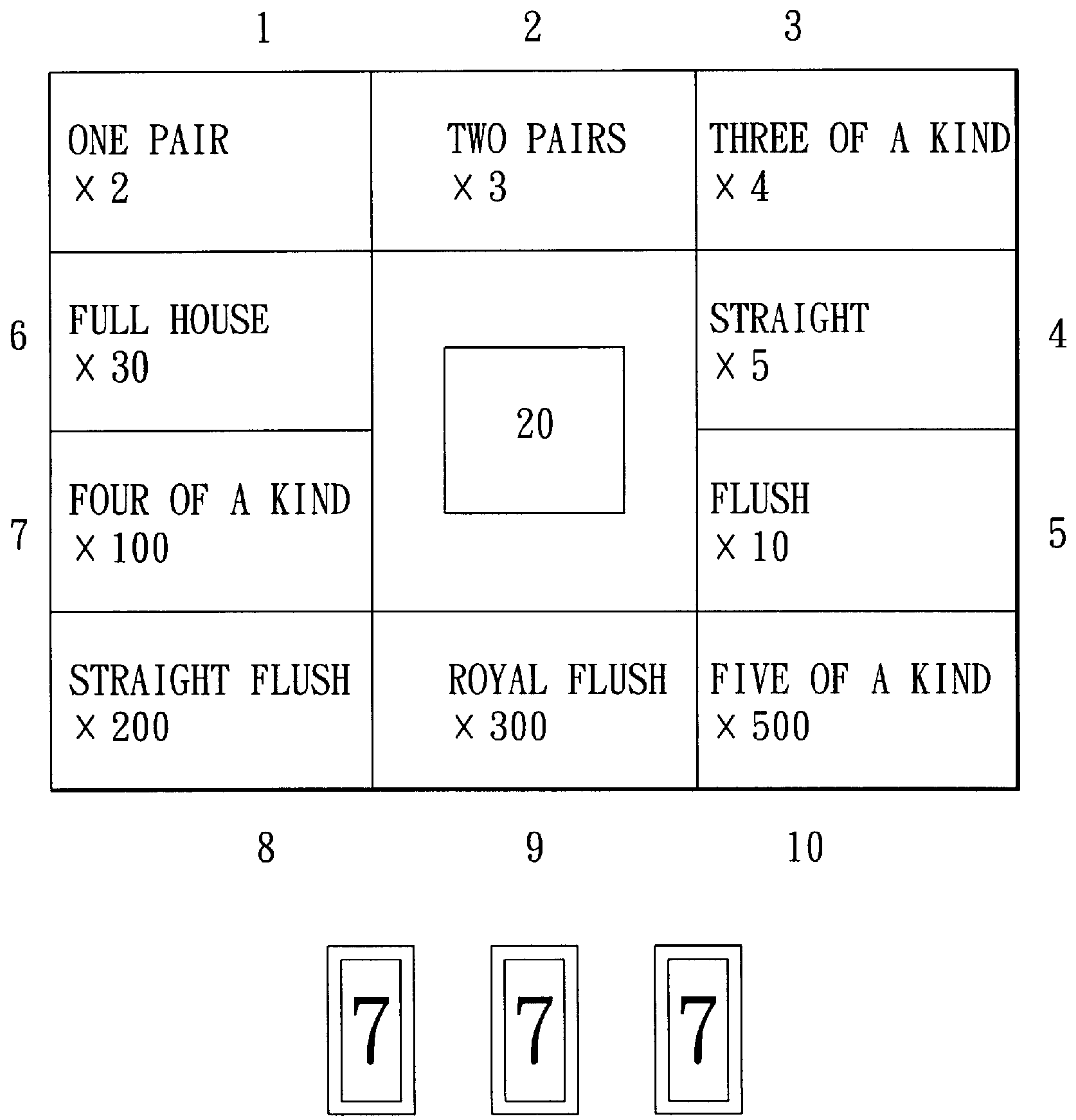
FIG. 4 illustrates how bets are placed in the preferred embodiment of this invention.

Referring to FIGS. 3 and 4, the program codes in the storage medium 121 control game progress as follows:

Game-initiating processing: When the gaming apparatus 1 is activated, the CPU 122 retrieves image data from the storage medium 121 and sends the same to the image processor 123 for processing. The output of the image processor 123 is sent to the display unit 13 to serve as a visual interface with the user. At the same time, audio data will be sent to the sound generating unit 14 for audio effects. As such, prior to starting a game, the display unit 13 is able to show a series of demonstration images until a player enters a game-playing command via the user input unit 11. The game-playing command can be input as a result of a coin-inserting action or operation of a start button.

Card-dealing processing: As shown in FIGS. 3 and 4, a first card game proceeds in step (a). At the onset of the first card game, the processor unit 12 will be directed to deal a number (m) of simulated cards to the player. In this embodiment, the number (m) is equal to five. The processor unit 12 may be directed to show some of the simulated cards in the (m) simulated cards face up and other ones of the simulated cards in the (m) simulated cards face down on the display unit 13. Then, in sub-step 20 of step (b), the processor unit 12 will be directed to show all possible winning card combinations and their associated multipliers on the display unit 13 for betting by the player. As shown in FIG. 4, there are ten possible winning card combinations, i.e. one pair (multiplier=2), two pairs (multiplier=3), three of a kind (multiplier=4), straight (multiplier=5), flush (multiplier=10), full house (multiplier=30), four of a kind (multiplier=100), straight flush (multiplier=200), royal flush (multiplier=300) and five of a kind (multiplier=500). Moreover, a variable (s) is set to 0 at this time. Then, in sub-step 21, the player is prompted to place a first bet on at least one of the winning card combinations via the user input unit 11. The first bet is shown at a corresponding position indicated by one of the numerals 1–10 that is adjacent to the associated winning card combination. During this sub-step, the processor unit 12 maybe directed to generate some audio-visual effects, such as switching of the background color of the display unit 13, so as to provide a hint to the player as to the possibility of large winnings in the subsequent second card game for reference by the player when placing a second bet for the second card game, which will be described in greater detail hereinafter. In this embodiment, large winnings are possible when a player card combination is ranked straight or higher. After placing the first bet, the flow proceeds to sub-step 22, where the processor unit 12 is directed to show the dealt (m) simulated cards face up on the display unit 13, and then to sub-step 23, where the processor unit 12 determines if one of the (m)

simulated cards is a designated wild card, such as a joker card. If no, the flow goes directly to sub-step 25. Otherwise, the flow proceeds to sub-step 24, where the processor unit 12 is directed to assign a face value to the designated wild card such that the (m) simulated cards form an optimum winning card combination, and then to sub-step 25, where the processor unit 12 is directed to determine the result of the first card game by matching the (m) simulated cards dealt to the player with the possible winning card combinations, and to adjust a credit total for the player according to the result of the first card game and with reference to the first bet placed by the player. Particularly, when the (m) simulated cards match one of the possible winning card combinations that was placed with the first bet, the winnings of the player are equal to the first bet placed on said one of the possible winning card combinations multiplied by the respective multiplier of said one of the possible winning card combinations. The new credit total for the player is stored by the processor unit 12 in the RAM 124. At this time, the first card game is over, and the flow proceeds to sub-step 26 for beginning the second card game.

In sub-step 26 of step (c), the processor unit 12 is directed to check whether the variable (s) is equal to 1. If yes, the flow goes to sub-step 32. Otherwise, the flow proceeds to sub-step 27.

In sub-step 27, the processor unit 12 is directed to deal a number (n) of simulated cards to the player. In this embodiment, the number (n) is equal to two. The (n) simulated cards are combined with the (m) simulated cards of the first card game, and the (m+n) simulated cards are reshuffled. The processor unit 12 is then directed to allow the player to select a number (p) of simulated cards from the (m+n) simulated cards. In this embodiment, the number (p) is equal to five. During card selection, the processor unit 12 may be directed to provide a hint, such as face value over ten, odd face value, etc., at some of the (m+n) simulated cards for reference by the player. The variable (s) is also incremented in this sub-step.

Thereafter, in sub-step 28, the player is prompted to place a second bet for the second card game via the user input unit 11. Unlike the first bet, which can be placed at any of the possible winning card combinations, there is only one second bet. After placing the second bet, the flow proceeds to sub-step 29, where the processor unit 12 is directed to show the selected (p) simulated cards face up on the display unit 13, and then to sub-step 30, where the processor unit 12 determines if one of the (p) simulated cards is a designated wild card, such as a joker card. If no, the flow goes directly to sub-step 32. Otherwise, the flow proceeds to sub-step 31, where the processor unit 12 is directed to assign a face value to the designated wild card such that the (p) simulated cards form an optimum winning card combination, and then to sub-step 32, where the processor unit 12 is directed to determine the result of the second card game by matching the selected (p) simulated cards with the possible winning card combinations, and to adjust the credit total for the player according to the result of the second card game and with reference to the second bet placed by the player. Particularly, when the (p) simulated cards match one of the possible winning card combinations, the winnings of the player are equal to the second bet multiplied by the respective multiplier of said one of the possible winning card combinations. For example, when the second bet is 20, and the (p) simulated cards correspond to a flush with a multiplier of 10, the winnings of the player are 20×10=200. The new credit total for the player is stored by the processor unit 12 in the RAM 124. At this time, the second card game is over, and the flow goes back to sub-step 26.

In sub-step 26, because the variable (s) has been incremented by 1, the flow then proceeds to step 33. In step 33, there may be a bonus game (such as a slot wheel game including three slot wheels as shown in FIG. 4) when the (p) simulated cards meet predetermined winning card combination criteria, such as a card ranking of three of a kind or higher. The player's credit total may be increased according to the result of the bonus game. In this embodiment, during the bonus game, when the three slot wheels stop at the same number, the winnings of the player in the second card game are multiplied by the number indicated by the slot wheels.

At the end of the second card game, the processor unit 12 may be directed to wait for a new game-playing command for starting another game round.

In practice, the computer-implemented method and gaming apparatus of this invention should not be limited to the aforesaid two successive card games. By changing the value of the variable (s) in sub-step 26, and by providing the player with an option to change the values of the numbers (n), (m) and (p), three or more different card games can be played in succession.

It has thus been shown that the computer-implemented method and gaming apparatus of this invention enable players to play different card games with different betting rules in succession in a single game round so as to maintain player interest for longer periods of time.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A computer-implemented method for playing at least first and second card games in succession, said computer-implemented method comprising:

a) providing a gaming apparatus that includes a user input unit and a display unit;

b) playing the first card game, including the steps of (b-1) enabling the gaming apparatus to deal a first number of simulated cards to the player, (b-2) allowing the player to place a first bet for the first card game via the user input unit, and (b-3) determining result of the first card game, and adjusting a credit total for the player according to the result of the first card game and with reference to the first bet placed by the player; and c) playing the second card game, including the steps of (c-1) enabling the gaming apparatus to deal a second number of the simulated cards to the player, to combine the second number of the simulated cards with the first number of the simulated cards, and to reshuffle the first and second numbers of the simulated cards, (c-2) allowing the player to select a third number of the simulated cards from the reshuffled first and second numbers of the simulated cards for playing the second card game, (c-3) allowing the player to place a second bet for the second card game via the user input unit, and (c-4) determining result of the second card game, and adjusting the credit total for the player according to the result of the second card game and with reference to the second bet placed by the player.

2. The computer-implemented method as claimed in claim 1, wherein:

instep (b-1), all possible winning card combinations are shown on the display unit, in step (b-2), the first bet is placed on at least one of the possible winning card combinations, and in step (b-3), the result of the first card game is determined by matching the simulated cards dealt to the player in step (b-1) with the winning card combinations.

3. The computer-implemented method as claimed in claim 2, wherein each of the possible winning card combinations is associated with a respective multiplier such that, when the simulated cards dealt to the player in step (b-1) match one of the winning card combinations that was placed with the first bet, winnings of the player are equal to the first bet placed on said one of the winning card combinations multiplied by the respective multiplier of said one of the winning card combinations.

4. The computer-implemented method as claimed in claim 1, wherein, in step (c-4), the result of the second card game is determined by matching the third number of the simulated cards selected by the player in step (c-2) with possible winning card combinations.

5. The computer-implemented method as claimed in claim 4, wherein each of the possible winning card combinations is associated with a respective multiplier such that, when the third number of the simulated cards selected by the player in step (c-1) match one of the winning card combinations, winnings of the player are equal to the second bet multiplied by the respective multiplier of said one of the winning card combinations.

6. The computer-implemented method as claimed in claim 1, wherein, in step (b-1), some of the simulated cards in the first number of the simulated cards are shown face up and other ones of the simulated cards are shown face down on said display unit.

7. The computer-implemented method as claimed in claim 1, wherein step (b-3) further includes the sub-step of, when one of the simulated cards in the first number of the simulated cards is a designated wild card, assigning a face value to the designated wild card such that the first number of the simulated cards form an optimum winning card combination.

8. The computer-implemented method as claimed in claim 1, further comprising the step of, prior to step c), enabling the gaming apparatus to provide a hint to the player as to possibility of large winnings in the second card game for reference by the player when placing the second bet.

9. The computer-implemented method as claimed in claim 1, wherein, in step (c-2), the gaming apparatus is enabled to hint at some of the first and second numbers of the simulated cards for reference by the player when selecting the third number of the simulated cards.

10. A computer program product for a gaming apparatus that includes a user input unit, a display unit and a processor unit coupled to the user input unit and the display unit, said computer program product adapting the gaming apparatus for playing at least first and second card games in succession, said computer program product comprising:

a computer readable storage medium comprising:

a first code that directs the processor unit to allow the player to play the first card game, including a code that directs the processor unit to deal a first number of simulated cards to the player, a code that directs the processor unit to allow the player to place a first bet for the first card game via the user input unit, and a code that directs the processor unit to determine result of the first card game, and to adjust a credit total for the player according to the result of the first card game and with reference to the first bet placed by the player; and a second code that directs the processor unit to allow the player to play the second card game, including: a code that directs the processor unit to deal a second number of the simulated cards to the player, to combine the second number of the simulated cards with the first number of the simulated cards, and to reshuffle the first and second numbers of the simulated cards; a code that directs the processor unit to allow the player to select a third number of the simulated cards from the reshuffled first and second numbers of the simulated cards for playing the second card game; a code that directs the processor unit to allow the player to place a second bet for the second card game via the user input unit; and a code that directs the processor unit to determine result of the second card game, and to adjust the credit total for the player according to the result of the second card game and with reference to the second bet placed by the player.

11. The computer program product as claimed in claim 10, wherein said first code further includes a code that directs the processor unit to show all possible winning card combinations on the display unit, the first bet being placed on at least one of the possible winning card combinations, the result of the first card game being determined by matching the simulated cards dealt to the player with the winning card combinations, and wherein each of the possible winning card combinations is associated with a respective multiplier such that, when the simulated cards dealt to the player for playing the first card game match one of the winning card combinations that was placed with the first bet, winnings of the player are equal to the first bet placed on said one of the winning card combinations multiplied by the respective multiplier of said one of the winning card combinations.

12. The computer program product as claimed in claim 10, wherein the result of the second card game is determined by matching the third number of the simulated cards selected by the player with possible winning card combinations, and wherein each of the possible winning card combinations is associated with a respective multiplier such that, when the third number of the simulated cards selected by the player match one of the winning card combinations, winnings of the player are equal to the second bet multiplied by the respective multiplier of said one of the winning card combinations.

13. The computer program product as claimed in claim 10, wherein said first code further includes a code that directs the processor unit to show some of the simulated cards in the first number of the simulated cards face up and other ones of the simulated cards face down on the display unit.

14. The computer program product as claimed in claim 10, wherein said first code further includes a code that directs the processor unit to enable the gaming apparatus to provide a hint to the player as to possibility of large winnings in the second card game for reference by the player when placing the second bet, and wherein said second code further includes a code that directs the processor unit to enable the gaming apparatus to provide a hint at some of the first and second numbers of the simulated cards for reference by the player when selecting the third number of the simulated cards.

15. A gaming apparatus for playing at least first and second card games in succession, said gaming apparatus comprising:

a user input unit;

a display unit;

means for allowing the player to play the first card game, including means for enabling said gaming apparatus to deal a first number of simulated cards to the player, means for allowing the player to place a first bet for the first card game via the user input unit, and means for determining result of the first card game, and for adjusting a credit total for the player according to the result of the first card game and with reference to the first bet placed by the player; and means for allowing the player to play the second card game, including: means for enabling said gaming apparatus to deal a second number of the simulated cards to the player, to combine the second number of the simulated cards with the first number of the simulated cards, and to reshuffle the first and second numbers of the simulated cards; means for allowing the player to select a third number of the simulated cards from the reshuffled first and second number of the simulated cards for playing the second card game; means for allowing the player to place a second bet for the second card game via the user input unit; and means for determining result of the second card game, and for adjusting the credit total for the player according to the result of the second card game and with reference to the second bet placed by the player.

16. The gaming apparatus as claimed in claim 15, wherein said means for playing the first card game further includes means for showing all possible winning card combinations on said display unit, the first bet being placed on at least one of the possible winning card combinations, the result of the first card game being determined by matching the simulated cards dealt to the player with the winning card combinations, and wherein each of the possible winning card combinations is associated with a respective multiplier such that, when the simulated cards dealt to the player for playing the first card game match one of the winning card combinations that was placed with the first bet, winnings of the player are equal to the first bet placed on said one of the winning card combinations multiplied by the respective multiplier of said one of the winning card combinations.

17. The gaming apparatus as claimed in claim 15, wherein the result of the second card game is determined by matching the third number of the simulated cards selected by the player with possible winning card combinations, and wherein each of the possible winning card combinations is associated with a respective multiplier such that, when the third number of the simulated cards selected by the player match one of the winning card combinations, winnings of the player are equal to the second bet multiplied by the respective multiplier of said one of the winning card combinations.

18. The gaming apparatus as claimed in claim 15, wherein said means for playing the first card game further includes means for showing some of the simulated cards in the first number of the simulated cards face up and other ones of the simulated cards face down on said display unit.

19. The gaming apparatus as claimed in claim 15, wherein said means for playing the first card game further includes means for providing a hint to the player as to possibility of large winnings in the second card game for reference by the player when placing the second bet, and wherein said means for playing the second card game further includes means for providing a hint at some of the first and second numbers of the simulated cards for reference by the player when selecting the third number of the simulated cards.

20. A gaming apparatus comprising a user input unit, a display unit, a processor unit coupled to said user input unit and said display unit, and a computer program product for adapting said gaming apparatus for playing at least first and second card games in succession, said computer program product comprising a computer readable storage medium that includes:

a first code that directs said processor unit to allow the player to play the first card game, including a code that directs said processor unit to deal a first number of simulated cards to the player, a code that directs said processor unit to allow the player to place a first bet for the first card game via said user input unit, and a code that directs said processor unit to determine result of the first card game, and to adjust a credit total for the player according to the result of the first card game and with reference to the first bet placed by the player; and a second code that directs said processor unit to allow the player to play the second card game, including: a code that directs said processor unit to deal a second number of the simulated cards to the player, to combine the second number of the simulated cards with the first number of the simulated cards, and to reshuffle the first and second numbers of the simulated cards; a code that directs said processor unit to allow the player to select a third number of the simulated cards from the reshuffled first and second numbers of the simulated cards for playing the second card game; a code that directs said processor unit to allow the player to place a second bet for the second card game via said user input unit; and a code that directs said processor unit to determine result of the second card game, and to adjust the credit total for the player according to the result of the second card game and with reference to the second bet placed by the player.

21. The gaming apparatus as claimed in claim 20, wherein said first code further includes a code that directs said processor unit to show all possible winning card combinations on said display unit, the first bet being placed on at least one of the possible winning card combinations, the result of the first card game being determined by matching the simulated cards dealt to the player with the winning card combinations, and wherein each of the possible winning card combinations is associated with a respective multiplier such that, when the simulated cards dealt to the player for playing the first card game match one of the winning card combinations that was placed with the first bet, winnings of the player are equal to the first bet placed on said one of the winning card combinations multiplied by the respective multiplier of said one of the winning card combinations.

22. The gaming apparatus as claimed in claim 20, wherein the result of the second card game is determined by matching the third number of the simulated cards selected by the player with possible winning card combinations, and wherein each of the possible winning card combinations is associated with a respective multiplier such that, when the third number of the simulated cards selected by the player match one of the winning card combinations, winnings of the player are equal to the second bet multiplied by the respective multiplier of said one of the winning card combinations.

23. The gaming apparatus as claimed in claim 20, wherein said first code further includes a code that directs said processor unit to show some of the simulated cards in the first number of the simulated cards face up and other ones of the simulated cards face down on said display unit.

24. The gaming apparatus as claimed in claim 20, wherein said first code further includes a code that directs said processor unit to enable said gaming apparatus to provide a hint to the player as to possibility of large winnings in the second card game for reference by the player when placing the second bet, and wherein said second code further includes a code that directs said processor unit to enable said gaming apparatus to provide a hint at some of the first and second numbers of the simulated cards for reference by the player when selecting the third number of the simulated cards.

* * * * *